US008126465B2

(12) United States Patent
Lu et al.

(10) Patent No.: US 8,126,465 B2
(45) Date of Patent: Feb. 28, 2012

(54) ADAPTIVE HANDOVER APPARATUS AND METHOD IN A HETEROGENEOUS NETWORK ENVIRONMENT

(75) Inventors: Yi-Hung Lu, Kaohsiung (TW); Yong-Hua Cheng, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 505 days.

(21) Appl. No.: 12/371,589

(22) Filed: Feb. 14, 2009

(65) Prior Publication Data

US 2010/0087195 A1    Apr. 8, 2010

(30) Foreign Application Priority Data

Oct. 3, 2008    (TW) ............................... 97138225 A (51) Int. Cl.
*H04W 36/00*    (2009.01)
(52) U.S. Cl. ........ 455/436; 455/437; 455/438; 455/440; 455/443; 370/203; 370/206; 370/208
(58) Field of Classification Search .................. 455/436, 455/437, 438, 440, 443
See application file for complete search history.

(56) References Cited

U.S. PATENT DOCUMENTS

| | | | |
|---|---|---|---|
| 6,370,129 B1 | 4/2002 | Huang | |
| 6,590,885 B1 | 7/2003 | Jorgensen | |
| 6,724,828 B1 | 4/2004 | Dabak | |
| 6,791,472 B1 | 9/2004 | Hoffberg | |
| 6,826,154 B2 | 11/2004 | Subbiah et al. | |
| 6,940,844 B2 | 9/2005 | Purkayastha et al. | |
| 7,009,952 B1 | 3/2006 | Razavilar et al. | |
| 7,046,719 B2 | 5/2006 | Chen et al. | |
| 7,092,405 B2 | 8/2006 | Guo et al. | |
| 7,151,931 B2 | 12/2006 | Tsao et al. | |
| 7,245,917 B2 | 7/2007 | Chiueh | |
| 2002/0024943 A1 | 2/2002 | Karaul et al. | |
| 2006/0019679 A1* | 1/2006 | Rappaport et al. | 455/456.5 |
| 2006/0030333 A1* | 2/2006 | Ward et al. | 455/456.1 |
| 2006/0039327 A1 | 2/2006 | Samuel et al. | |
| 2007/0008929 A1 | 1/2007 | Lee et al. | |
| 2007/0133472 A1 | 6/2007 | Kim et al. | |
| 2007/0217427 A1* | 9/2007 | Chung | 370/395.2 |

* cited by examiner

*Primary Examiner* — Patrick Edouard
*Assistant Examiner* — Julio Perez (57) ABSTRACT

An adaptive handover method in a heterogeneous network environment collects estimation information for a channel environment and integrates with a wireless device's geographic information to decide two groups of recursive parameters and a channel theoretical signal model. The model and the first group of recursive parameters are used to execute recursive iteration for a signal strength decay theoretical value. The obtained actual signal strength decay value from channel estimation, the second group of recursive parameters and the signal strength decay estimation value at previous iteration are used to execute channel-tracking recursive iteration for obtaining a signal strength decay tracking value. The current network status and the signal strength decay tracking value are used to predict and analyze system performance of heterogeneous networks. A decision is made based on each heterogeneous network's analyzed result, and an adaptive handover procedure is prepared by following the decision.

15 Claims, 6 Drawing Sheets

ADAPTIVE HANDOVER APPARATUS AND METHOD IN A HETEROGENEOUS NETWORK ENVIRONMENT

FIELD OF THE INVENTION

The present invention generally relates to an adaptive handover apparatus and method in a heterogeneous network environment.

BACKGROUND OF THE INVENTION

The rapid progress of wireless communication in recent years extends the information and communication services from digital homes to mobile lives. Different types of wireless communication technologies are widely applied to daily lives so that the demands in accessing internet resources through wireless devices also increase.

The current wireless communication technologies follow three major trends. First, wireless communication service providers are moving from providing pure voice service, such as GSM, to IP-based network service, including integrating voice, high speed data and multimedia streaming, such as GPRS and 3.5G. Second, broadband network communication providers are moving from providing local packet-switched internet service, such as ADSL, WiFi, to providing mobile communication/internet full service, such as DSRC, WiMAX. Third, information communication service system integrators are using information and communication technology (ICT) to provide new applications and services and IT-enabled service-based service integration technology and extend to the developments of all types of handheld mobile devices to offer real time streaming services in heterogeneous network environments.

The personal mobile service market is also expanding from three major directions, including first, the provision of real time multimedia entertainment on demand service, such as the user using portable device to request service from a remote server individually and ubiquitously and obtaining multimedia service, such as audiovisual replay and global positioning system (GPS); second, having the integration capability of multiple communication network interfaces, such as portable devices with different network communication interfaces able to switch in different environment to maintain optimal communication state; and third, the provision of seamless roaming in heterogeneous network environment, such as user of portable device able to obtain personal service at home, community or in mobility, towards the ubiquity and quality of service regardless of the change of network access.

Figure 1:
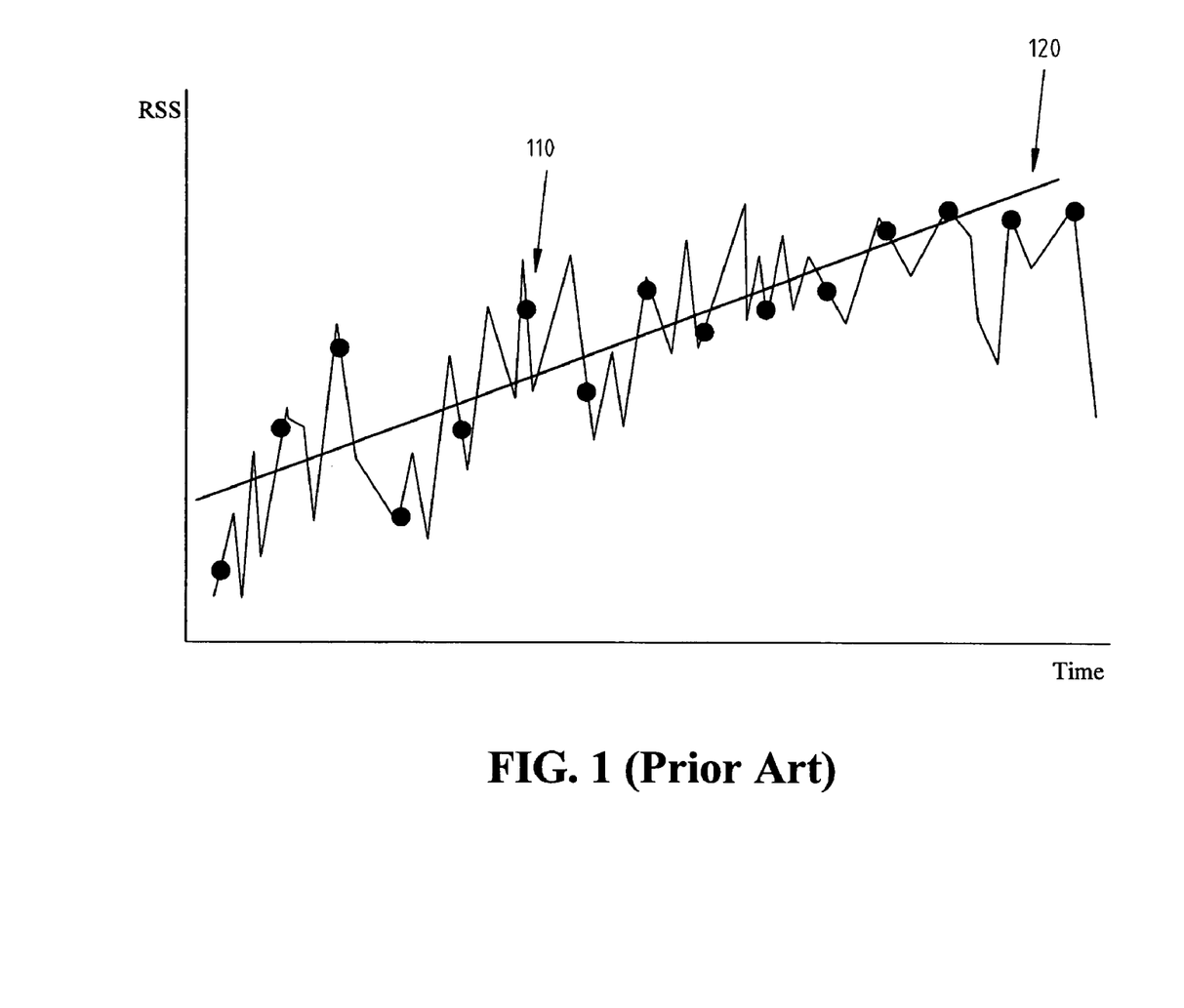
FIG. 1 shows a schematic view of an exemplary vertical handoff method.

Take the implementation of adaptive handover mechanism of service roaming in heterogeneous network as an example. U.S. Patent Publication No. 2007/0133472 disclosed a method of vertical handoff to predict the received signal strength (RSS) of a single system to realize the handoff in heterogeneous network. As shown in FIG. 1, the method of vertical handoff aims at the wireless network of a single small area and uses the least square (LS) algorithm, i.e., least square line 120, to predict the future RSS transition pattern 110 to achieve the handoff in heterogeneous network.

However, to achieve ubiquitous roaming in short, medium and long range heterogeneous network, one of the important issues is how to achieve seamless handover in different heterogeneous networks effectively and rapidly. Based on the integration service technology of mobile heterogeneous networks and targeting different heterogeneous network environments, it is important to integrate the channel estimation information to estimate the change of adaptive signal-tracking decay in addition to designing algorithm so as to improve the estimation handover correctness and reduce the system computation load.

SUMMARY OF THE INVENTION

The disclosed exemplary embodiments of the present invention may provide an adaptive handover apparatus and method, applicable to different heterogeneous network environments.

In an exemplary embodiment of the present invention, the disclosed is directed to an adaptive handover apparatus in a heterogeneous network environment. The adaptive handover apparatus comprises an adaptive model control unit, a power gain prediction unit, a heterogeneous networks analysis unit and a handover decision unit.

When a wireless device is activated, the adaptive model control unit collects the estimation information of the channel environment and integrates the geographic information of the wireless device to determine two groups of recursive parameters and a channel theoretical signal model. The power gain prediction unit executes recursive iteration for a signal strength decay theoretical value according to the channel theoretical signal model and the first group of recursive parameters. The power gain prediction unit also executes recursive iteration on channel-tracking for obtaining a signal strength decay tracking value through the obtained actual signal strength decay value from channel estimation, second group of recursive parameters and the signal strength decay estimation value at previous iteration. The heterogeneous networks analysis unit predicts and analyzes system performance of heterogeneous networks via the current network status and the signal strength decay tracking value. Based on the analyzed result, prediction time is also regulated. The handover decision unit makes a final decision based on each heterogeneous network's analyzed result, and an adaptive handover procedure is prepared by following the decision.

In another exemplary embodiment of the present invention, the disclosed is directed to an adaptive handover method in heterogeneous network environments. The adaptive handover method comprises: collecting channel environment estimation information and integrating with a wireless device's geographic information to decide a first and a second groups of recursive parameters and a channel theoretical signal model; based on the model and the first group of recursive parameters, executing recursive iteration for a signal strength decay theoretical value, and based on the obtained actual signal strength decay value from channel estimation, second group of recursive parameters and the signal strength decay estimation value at previous iteration, executing recursive iteration on channel-tracking for obtaining a signal strength decay tracking value; based on the current network status and the signal strength decay tracking value, predicting and analyzing system performance of heterogeneous networks, and based on the analyzed result, regulating prediction time of estimating heterogeneous network signal strength decay; and based on each heterogeneous network's analyzed result, making a final decision and based on the decision, preparing for an adaptive handover procedure.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 2:
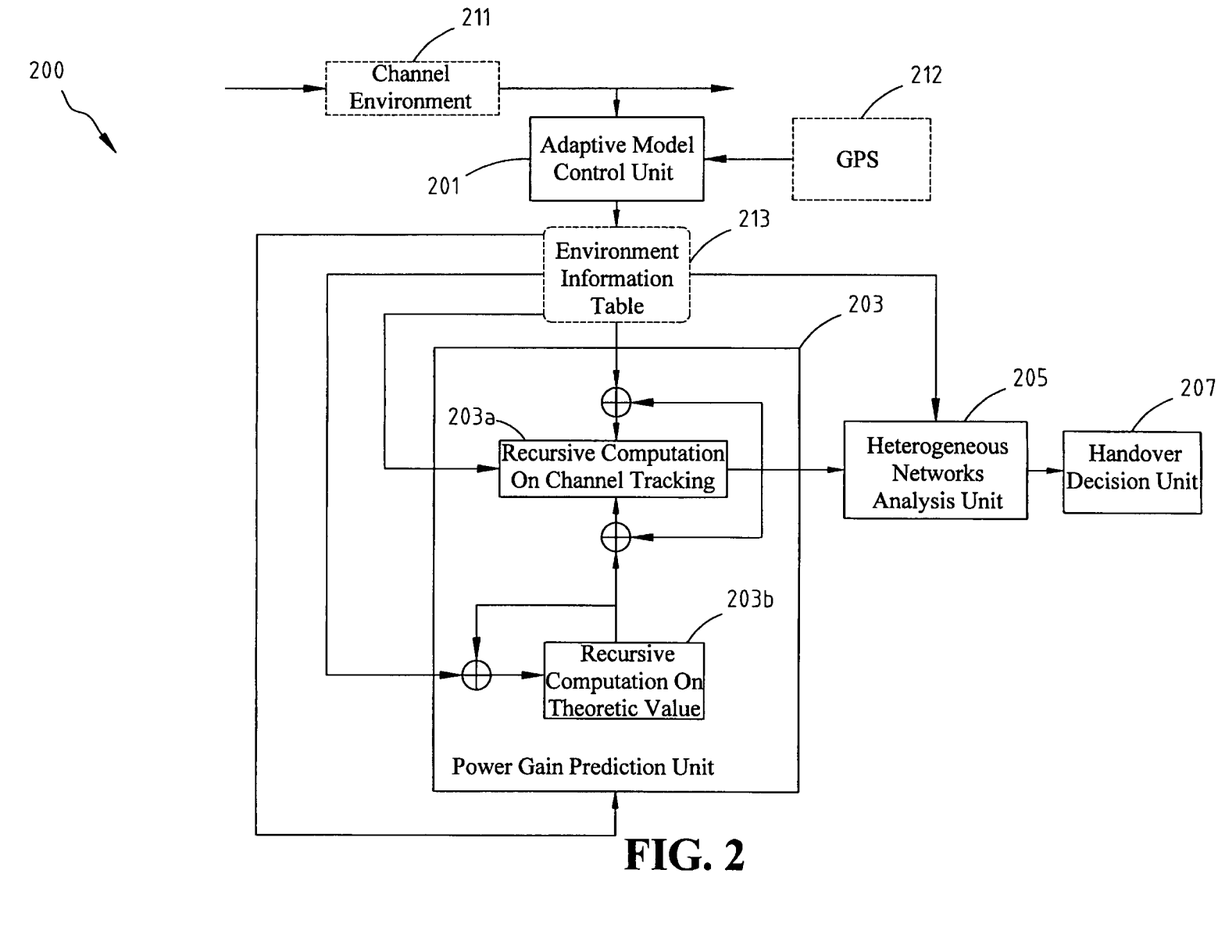
FIG. 2 shows an exemplary schematic view of an adaptive handover apparatus in a heterogeneous network environment, consistent with certain disclosed embodiments of the present invention.

FIG. 2 shows an exemplary schematic view of an adaptive handover apparatus 200 in a heterogeneous network environment, consistent with certain disclosed embodiments of the present invention. As shown in FIG. 2, adaptive handover apparatus 200 comprises an adaptive model control unit 201, a power gain prediction unit 203, a heterogeneous networks analysis unit 205 and a handover decision unit 207.

Adaptive handover apparatus 200 is applicable to diverse heterogeneous network environment, such as, IP-based network, packet-switched network, and so on, and is applicable to predict the signal strength decay in the handover process in the heterogeneous network environment. The exemplary embodiment of the present invention uses an algorithm, such as least mean square (LMS), as a core to establish a mathematical recursive model, and integrates channel estimation information to estimate the signal strength decay as the basis of performance analysis of heterogeneous network system, as well as prepares adaption switch of communication physical layer and network layer for the channel change to achieve the handover in the diverse heterogeneous network environment effectively and rapidly.

Figure 3:
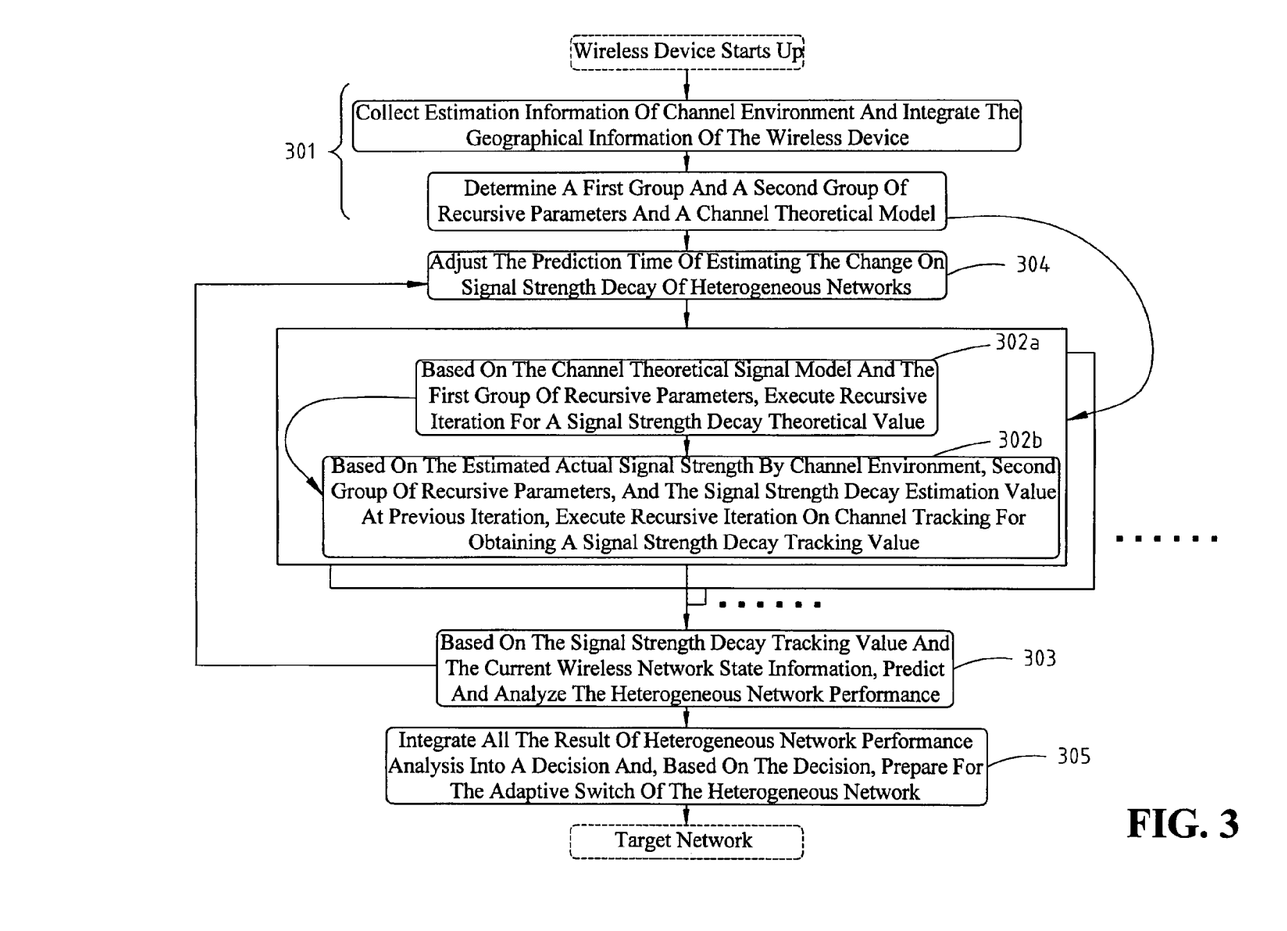
FIG. 3 shows an exemplary schematic view illustrating the operation of the adaptive handover apparatus of FIG. 2 in heterogeneous network environment, consistent with certain disclosed embodiments of the present invention.

FIG. 3 shows an exemplary operation flow of the adaptive handover apparatus 200, consistent with certain disclosed embodiments of the present invention. The following description refers to both FIGS. 2 and 3. When a wireless device starts up, adaptive model control unit 201 first collects estimation information of channel environment 211, such as signal strength, sign-to-noise ratio (SNR), bandwidth, and so on, and integrates the geographical information of the wireless device, such as through a GPS 212 to obtain the moving speed, relative location of the wireless device, and so on. Then, adaptive model control unit 201 determines a first group and a second group of recursive parameters and a channel theoretical signal model, as shown in step 301.

The first group and the second group of recursive parameters and channel theoretical signal model information may be recorded in an environment information table 213 to provide the required information to the next iteration of power gain prediction unit 203 and heterogeneous networks analysis unit 205. Adaptive model control unit 201 may be based on the current moving speed of the wireless device for screening usable network systems.

Based on the channel theoretical signal model and the first group of recursive parameters, such as recursive parameter $\mu_1$, power gain prediction unit 203 executes recursive iteration for a signal strength decay theoretical value, as shown in step 302a. For example, an algorithm is used as a core to establish a mathematic recursive model for recursive computation on the signal strength decay theoretic value. The estimated actual signal strength by channel environment 211, second group of recursive parameters, such as recursive parameter $\mu_2$ and $\mu_3$, and the signal strength decay estimation value at previous iteration are used to execute recursive iteration on channel tracking for obtaining a signal strength decay tracking value, as shown in step 302b. For example, an algorithm is used as a core to establish another mathematic recursive model for the recursive computation on channel tracking.

In step 302a, the recursive computation of the signal strength decay theoretic value may use a least mean square (LMS) algorithm to rectify the signal strength decay estimated value. The signal strength decay estimated value is rectified by referring to the previous iteration of channel theoretical signal model and recursive parameter change estimated by the channel so that the signal strength decay estimated value may be closer to the actual environment. The following equation is an exemplary mathematic recursive model established for the theoretic recursive computation.

$$\hat{G}(t+\Delta t) = \hat{G}(t) + \mu_1 * (\hat{G}_{Theory}(t+\Delta t) - \hat{G}(t))$$

where $\hat{G}$ is the signal strength decay estimated value, $\hat{G}_{Theory}$ is the signal decay theoretic value, t is the current time, $\Delta t$ is the time difference, and $\mu_1$ is a first group recursive parameter.

In step 302b, the recursive computation on channel tracking may use LMS algorithm to fine tune the signal strength decay tracking value. The fine tune refers to the aforementioned rectified signal strength decay estimated value and actual measured signal strength decay value, and performs recursive computation on signal strength decay tracking value. With the adaptive tracking channel change, the precise prediction of the signal decay value may be obtained. The following equation is an exemplary mathematic recursive model established for the recursive computation on channel tracking.

$$\hat{G}_{Tracking}(t+\Delta t) = \hat{G}_{Tracking}(t) + \mu_2 * (\text{RSS}(t)/\text{TSS}(t) - \hat{G}_{Tracking}(t)) + \mu_3 * (\hat{G}(t+\Delta t) - \hat{G}_{Tracking}(t))$$

where $\hat{G}_{Tracking}$ is the signal strength decay tracking value, RSS is the received signal strength, TSS is the transmitted signal strength, and $\mu_2$ and $\mu_3$ are both second group recursive parameters.

Based on the signal strength decay tracking value obtained by power gain prediction unit 203 and the current wireless network state information, such as current network bandwidth and SNR, heterogeneous network analysis unit 205 predicts and analyzes the heterogeneous network performance, as shown in step 303, to provide the basis for next iteration handover. Based on the result of the prediction and analysis, heterogeneous network analysis unit 205 also adjusts the prediction time of estimating the change on signal strength decay of heterogeneous networks, as shown in step 304. The prediction time is adjustable.

As shown in step 305, handover decision unit 207 integrates all the result of heterogeneous network performance analysis into a decision and, based on the decision, prepares for the adaptive switch of the heterogeneous network, such as preparing the adaptive switch between the communications physical layer and network layer of heterogeneous networks.

After switching to target network, adaptive handover apparatus 200 of the present invention returns to step 301. In this manner, adaptive handover apparatus 200 and its operation may dynamically adjust the algorithm parameters for the time-dependent environment of the wireless communication to achieve establishing the channel estimation mathematic recursive model and the adaptive signal decay estimation mechanism.

Figure 4:
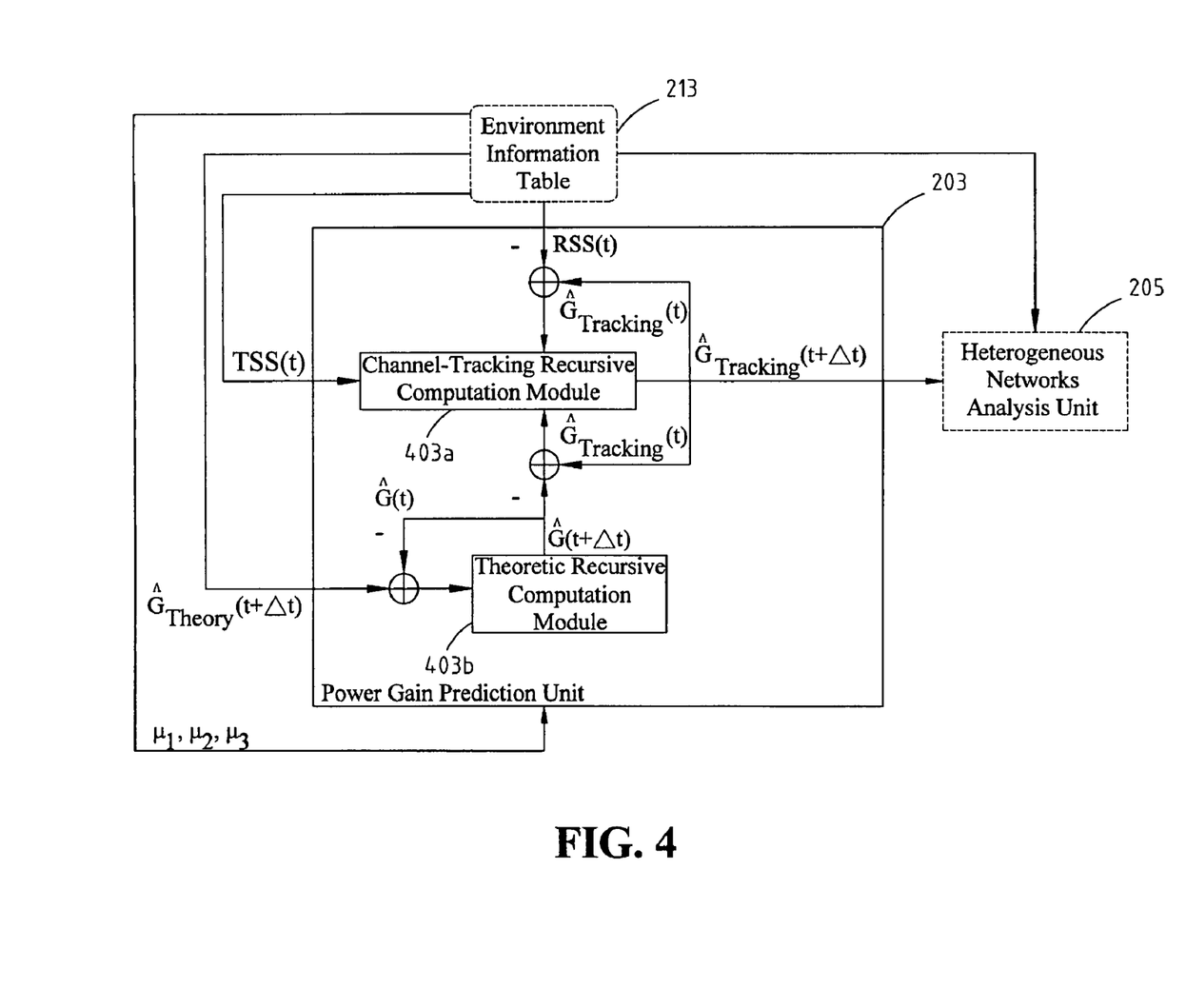
FIG. 4 shows an exemplary schematic view of the detailed structure and operation of the power gain prediction unit, consistent with certain disclosed embodiments of the present invention.

Following the above description, power gain prediction unit 203 may be divided into two parts. The first part is to realize the recursive computation on theoretic value and the second part is to realize the recursive computation on channel tracking, marked as 203a and 203b in FIG. 2, respectively. FIG. 4 further shows an exemplary schematic view of the detailed structure and operation of the power gain prediction unit 203, consistent with certain disclosed embodiments of the present invention. As shown in FIG. 4, power gain prediction unit 203 includes a channel-tracking recursive computation module 403a and a theoretic recursive computation module 403b.

Based on channel theoretic model $\hat{G}_{Theory}$, and the first group parameter, such as, $\mu_1$, provided by step 301 to serve as the input to the mathematic recursive model established for the recursive computation on signal strength decay theoretic value, theoretic recursive computation module 403b executes the update of estimated value of the signal strength decay, i.e., $\hat{G}(t+\Delta t)$, so that the signal decay model may be close to the actual environment.

Based on the actual signal strength decay value (i.e., RSS(t)/TSS(t)) obtained by channel estimation, second group recursive parameters, such as, $\mu_2$ and $\mu_3$, and the signal strength decay estimation value $\hat{G}(t+\Delta t)$ estimated at previous iteration to serve as the input to the mathematic recursive model established for recursive computation on channel tracking, channel tracking recursive computation module 403a executes signal strength decay prediction tracking $\hat{G}_{Tracking}(t+\Delta t)$.

Inputting signal strength decay prediction tracking $\hat{G}_{Tracking}(t+\Delta t)$ to heterogeneous network analysis unit 205 and integrating with the current wireless network state information, as aforementioned, the heterogeneous network performance analysis may be executed. Based on the analysis result, the prediction time of estimating heterogeneous network signal strength decay change may be adjusted.

Figure 5:
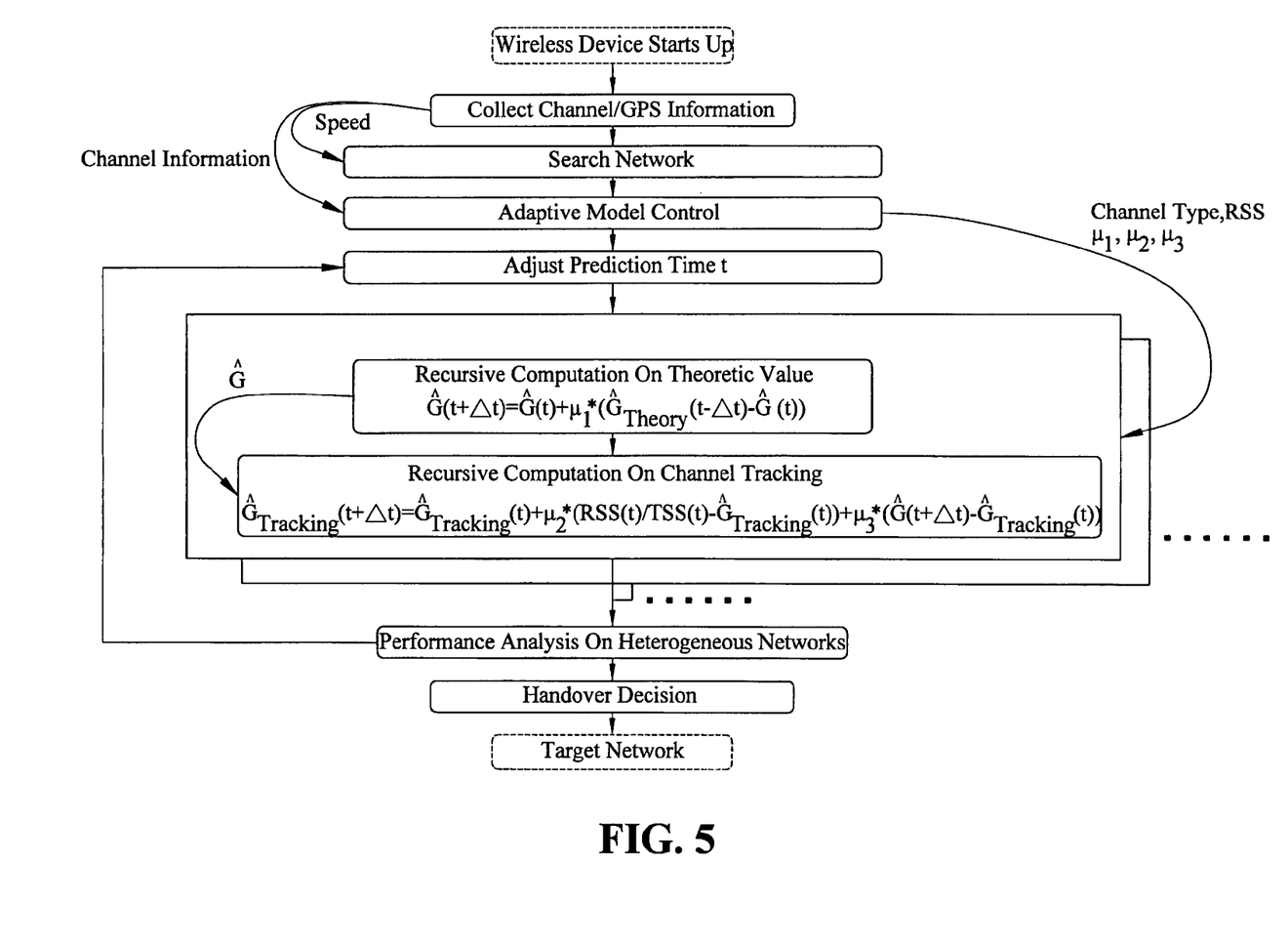
FIG. 5 shows an exemplary schematic view illustrating the operation flow of an adaptive handover method, by using an exemplary algorithm like least mean square (LMS), consistent with certain disclosed embodiments of the present invention.

Following the above description, FIG. 5 shows an exemplary schematic view illustrating the operation flow of an adaptive handover method, by using an exemplary algorithm like LMS, consistent with certain disclosed embodiments of the present invention, where the recursive parameters are ($\mu_1$, $\mu_2$, $\mu_3$), and the mathematic recursive models are as aforementioned. Therefore, the details of the operation will not be described.

It may be seen that the adaptive handover apparatus and method of the present invention uses a plurality of system signals to realize the handover in heterogeneous network environment. Because a plurality of wireless network signal decay ratios is referenced, the stability of handover in heterogeneous network environment may be enhanced. In addition, the use of channel prediction information for mathematic model recursive computation also adaptively tracks the signal decay change; therefore, the correctness rate of the handover in heterogeneous network environment is improved. The use of recursive computation to perform the prediction of mathematic model algorithm also reduces the system computation load and improves the efficiency.

Figure 6:
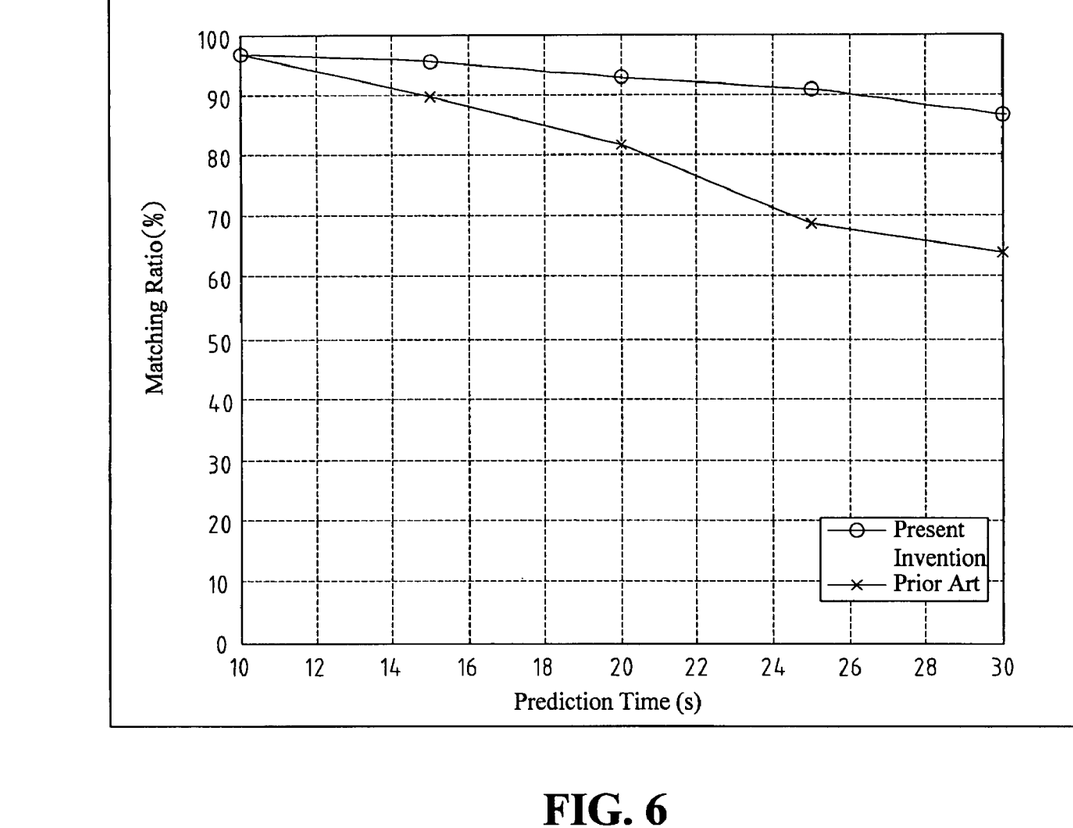
FIG. 6 shows a schematic view of a comparison of exemplary simulated performances between the present invention and a conventional vertical handoff method.

FIG. 6 shows a schematic view of a comparison of exemplary simulated performances between the present invention and a conventional vertical handoff method, where the x-axis is the prediction time (s) and y-axis is the matching ratio. The matching means that the network selected by the algorithm is the optimal among all the networks. The matching ratio is the number of matches by the algorithm in a time unit divided by the number of computations by the algorithm in a time unit. The simulation parameters are: 3.5G and WiFi wireless communication interfaces are used, signal strength is the sample for performance analysis by collecting the signal strength change of 3.5G and WiFi in actual environment, and according to different prediction times, the matching ratios for conventional vertical handoff method and the present invention are computed.

As shown in FIG. 6, compared to the conventional vertical handoff method, the present invention has a higher matching ratio in diverse heterogeneous network environment. In other words, the handover mechanism of the present invention has a better correctness rate for handover prediction.

In summary, the disclosed exemplary embodiments of the present invention provide a mechanism for predicting signal strength decay in the handover process applicable to a heterogeneous network environment, such as LMS algorithm, and integrate with the channel estimation information to fine tune the signal strength decay estimation to serve as a basis for heterogeneous network performance analysis. The disclosed exemplary embodiments of the present invention also target the channel change to prepare in advance the adaptive switch between the communication physical layer and network layer so as to achieve the object of handover in the diverse heterogeneous network environment effectively and rapidly.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An adaptive handover apparatus for a heterogeneous network environment, comprising:
    an adaptive model control unit, collecting estimation information of a channel environment when a wireless device starting up, and integrating geographical information of said wireless device to determine a first group and a second group of recursive parameters and a channel theoretic model;
    a power gain prediction unit, based on said channel theoretic model and said first group of recursive parameters, performing recursive computation on signal strength decay theoretic value, and based on actual signal strength decay value predicted by said channel estimation, said second group of recursive parameters and said recursive computation of signal strength decay estimated value of previous iteration, performing recursive computation on channel tracking to obtain signal strength decay tracking value;
    a heterogeneous networks analysis unit, based on said signal strength decay tracking value and current wireless network state information, performing prediction and analysis on heterogeneous network performance and adjusting prediction time of the change on signal strength decay of heterogeneous networks; and
    a handover decision unit, based on said heterogeneous performance analysis to reach a decision and based on said decision to prepare adaptive switching of heterogeneous networks;
    wherein said power gain prediction unit uses said actual signal strength decay value predicted by said channel, said second group of recursive parameters and said recursive computation of signal strength decay estimated value at previous iteration as input to an algorithm to establish a second mathematic recursive model for performing said recursive computation on channel tracking.

2. The adaptive handover apparatus as claimed in claim 1, wherein said heterogeneous network environment is a diverse heterogeneous network environment.

3. The adaptive handover apparatus as claimed in claim 1, said apparatus realize handover in heterogeneous network through a plurality of system signals.

4. The adaptive handover apparatus as claimed in claim 1, wherein said power gain prediction unit uses said channel theoretic model and said first group of recursive parameters as input to an algorithm to establish a first mathematic recursive model for performing said recursive computation on signal strength decay theoretic value.

5. The adaptive handover apparatus as claimed in claim 1, wherein said geographical information of said wireless device further includes information on moving speed and relative location of said wireless device.

6. The adaptive handover apparatus as claimed in claim 1, wherein said geographical information of said wireless device is information obtained through a global positioning system.

7. The adaptive handover apparatus as claimed in claim 1, wherein information of said first group of recursive parameters, said second group of recursive parameters and said channel theoretic model is recorded in an environment information table.

8. An adaptive handover apparatus for a heterogeneous network environment, comprising:
   an adaptive model control unit, collecting estimation information of a channel environment when a wireless device starting up, and integrating geographical information of said wireless device to determine a first group and a second group of recursive parameters and a channel theoretic model;
   a power gain prediction unit, based on said channel theoretic model and said first group of recursive parameters, performing recursive computation on signal strength decay theoretic value, and based on actual signal strength decay value predicted by said channel estimation, said second group of recursive parameters and said recursive computation of signal strength decay estimated value of previous iteration, performing recursive computation on channel tracking to obtain signal strength decay tracking value;
   a heterogeneous networks analysis unit, based on said signal strength decay tracking value and current wireless network state information, performing prediction and analysis on heterogeneous network performance and adjusting prediction time of the change on signal strength decay of heterogeneous networks; and
   a handover decision unit, based on said heterogeneous performance analysis to reach a decision and based on said decision to prepare adaptive switching of heterogeneous networks;
   wherein said power gain prediction unit further includes:
   a theoretic value recursive computation module, according to said channel theoretic model and said first group of recursive parameters and taking them as input to a mathematic recursive model for performing prediction update of signal strength decay value; and
   a channel tracking recursive computation module, according to said actual signal strength decay value predicted by said channel, said second group of recursive parameters and said recursive computation of signal strength decay estimated value at previous iteration and taking them as input to another mathematic recursive model for performing said recursive computation on channel tracking to obtain signal strength decay tracking value.

9. A handover method for a heterogeneous network environment, comprising:
   when a wireless device starting up, collecting channel environment estimation information and integrating with said wireless device's geographic information to decide a first and a second groups of recursive parameters and a channel theoretical model;
   based on said channel theoretic model and said first group of recursive parameters, executing recursive iteration for a signal strength decay theoretical value, and based on actual signal strength decay value from channel estimation, said second group of recursive parameters and said signal strength decay estimation value at previous iteration, executing recursive iteration on channel tracking for obtaining a signal strength decay tracking value;
   based on current network status and said signal strength decay tracking value, predicting and analyzing system performance of heterogeneous networks, and adjusting prediction time of estimating the change on signal strength decay of heterogeneous networks; and
   based on each heterogeneous network's analyzed result, making a decision and based on said decision, preparing for an adaptive switching in heterogeneous networks;
   wherein said method uses said channel theoretic model and said first group of recursive parameters as input to an algorithm to establish a first mathematic recursive model for performing said recursive computation on signal strength decay theoretic value, and uses said actual signal strength decay value predicted by said channel, said second group of recursive parameters and said recursive computation of signal strength decay estimated value of previous iteration as input to another algorithm to establish another mathematic recursive model for performing recursive computation on channel tracking to obtain a signal strength decay tracking value.

10. The adaptive handover method as claimed in claim 9, wherein said algorithm is least mean square algorithm.

11. The adaptive handover method as claimed in claim 9, wherein said another algorithm is least mean square algorithm.

12. The adaptive handover method as claimed in claim 9, wherein said preparation of adaptive switching in heterogeneous networks is preparation adaptive switching in heterogeneous networks between communication physical layer and network layer.

13. The adaptive handover method as claimed in claim 9, said method adjusts, based on said analysis result, prediction time for estimating the change on signal strength decay of heterogeneous networks.

14. The adaptive handover method as claimed in claim 9, said method targets different heterogeneous network environments and performs recursive computation on said signal strength decay theoretic value and said recursive computation on channel tracking through least mean square algorithms.

15. The adaptive handover method as claimed in claim 9, wherein after handover is completed, said method returns to said step of:
   when a wireless device starting up, collecting channel environment estimation information and integrating with said wireless device's geographic information to decide a first and a second groups of recursive parameters and a channel theoretical model.

* * * * *